(12) United States Patent
Li et al.

(10) Patent No.: US 7,870,081 B2
(45) Date of Patent: Jan. 11, 2011

(54) PARALLELIZATION OF BAYESIAN NETWORK STRUCTURE LEARNING

(75) Inventors: Eric Q. Li, Beijing (CN); Wei Hu, Beijing (CN)

(73) Assignee: Intel Corporation, Santa Clara, CA (US)

( * ) Notice: Subject to any disclaimer, the term of this patent is extended or adjusted under 35 U.S.C. 154(b) by 885 days.

(21) Appl. No.: 11/665,901

(22) PCT Filed: Dec. 31, 2004

(86) PCT No.: PCT/CN2004/001589

§ 371 (c)(1),
(2), (4) Date: Apr. 20, 2007

(87) PCT Pub. No.: WO2006/069494

PCT Pub. Date: Jul. 6, 2006

(65) Prior Publication Data

US 2008/0275827 A1 Nov. 6, 2008

(51) Int. Cl.
G06F 15/18 (2006.01)

(52) U.S. Cl. ...................................................... 706/12
(58) Field of Classification Search .................... 706/10
See application file for complete search history.

(56) References Cited

U.S. PATENT DOCUMENTS

| | | | |
|---|---|---|---|
| 5,893,058 A | 4/1999 | Kosaka | |
| 6,018,728 A | 1/2000 | Spence et al. | |
| 6,058,206 A | 5/2000 | Kortge | |
| 6,578,065 B1 | 6/2003 | Aglietti et al. | |
| 6,662,273 B1 | 12/2003 | Wilkerson et al. | |
| 6,992,625 B1 | 1/2006 | Krumm et al. | |
| 7,047,169 B2 | 5/2006 | Pelikan et al. | |
| 7,627,537 B2 | 12/2009 | Lai | |
| 2003/0214583 A1 | 11/2003 | Sadok | |
| 2003/0215141 A1 | 11/2003 | Zakrzewski | |
| 2003/0215143 A1 | 11/2003 | Zakrzewski et al. | |
| 2003/0220906 A1 | 11/2003 | Chickering | |
| 2004/0154019 A1 | 8/2004 | Aamodt et al. | |
| 2004/0181554 A1 | 9/2004 | Heckerman et al. | |
| 2004/0267686 A1 | 12/2004 | Chayes et al. | |

(Continued)

FOREIGN PATENT DOCUMENTS

JP 11353296 12/1999

OTHER PUBLICATIONS

Mapping and Parallel Implementation of Bayesian Belief Networks: Saxena, 1996, IEEE, 0-8186-7683, pp. 608-611.*

(Continued)

*Primary Examiner*—Donald Sparks
*Assistant Examiner*—Peter Coughlan
(74) *Attorney, Agent, or Firm*—Blakely, Sokoloff, Taylor & Zafman LLP (57) ABSTRACT

A master computing node directs parallel structure learning with intelligent computational task distribution. The master computing node may determine what families are to be used to score neighbors in a neighbor scoring process, and determine if the families have scores in a score cache. Families to be scored for the score cache may be marked and distributed for calculation among nodes in the computing cluster. The score cache may be updated to include the scored families, and the cluster synchronized with the score cache data.

12 Claims, 4 Drawing Sheets

U.S. PATENT DOCUMENTS

| | | |
|---|---|---|
| 2005/0027941 A1 | 2/2005 | Wang et al. |
| 2005/0081207 A1 | 4/2005 | Hoflehner et al. |
| 2005/0125802 A1 | 6/2005 | Wang et al. |
| 2006/0112057 A1 | 5/2006 | Lai |

OTHER PUBLICATIONS

'Parallelization of Bayesian network based SNPs Pattern Analysis and Performance Characterization on SMP/HT': Song, Jul. 2004, IEEE, 1521-9097.*

CN PTO, "Second Office Action", Chinese Application No. 200480044793.1, Issued Mar. 6, 2009, 3 pages.

"Notice of Allowance", U.S. Appl. No. 10/977,861, mailed Jun. 10, 2009, whole document.

CN PTO, Third Office Action, Chinese Patent Application No. 200480044793.1 issued Jun. 26, 2009, 3 pages.

First Office Action mailed Jul. 11, 2008 for Chinese Application No. 2004 80044793.1.

Sterritt et al., Parallel Data Mining of Bayesian Networks from Telecommunications Network Data, Proceedings of the 15 IPDPS 2000 Workshops on Parallel and Distributed Processing, 2000, 8 pages.

Brown et al., A Novel Algorithm for Scalable and Accurate Bayesian Network Learning, Proceeding of the 11th World congress on Medical Informatics, Sep. 2004, 5 pages.

Chen et al., Learning Bayesian Network Structure from Distributed Data, Proceedings of SIAM Int'l Conference on Data Mining, 2003, 5 pages.

Song et al., Parallelization of Bayesian Network Based SNPs Pattern ANalysis and Performance Characterization on SMP/HT, Proceedings of the 10th Int'l Conference on Parallel and Distributed Systems, 2004, 8 pages.

Lam et al., A Parallel Learning Learning Algorithm for Bayesian Inference Networks, Dept. of Systems Engineering & Engineering Mgmt., the Chinese Univ. of Hong Kong, Dep't of Mgmt. Sciences, the Univ. of Iowa, 35 pages.

Mitchell, Bayesian Learning, lecture slides for textbook Machine Learning, 1997, pp. 125-174, McGraw Hill.

Tsamardinos et al., Scaling-Up Bayesian Network Learning to Thousands of Variables Using Local Learning Techniques, Department of Biomedical Informatice, Vanderbilt University, Nashville, TN, 5 pafes (DSL TR-03-02, Mar. 12, 2003).

Xi et al., A Smart Hill-climbing Algorighm for Application Server Configuration WWW2004, May 17-22, 2004, New York, New York, USA, ACM 1-58113-844-X/04/0005, 10 pages.

Int'l Application No. PCT/CN2004/001589 filed Dec. 31, 2004, Int'l Search Report & Written Opinion dated Sep. 29, 2005.

Pending U.S. Appl. No. 11/182,613, filed Jul. 15, 2005, inventor Li; 1st Office Action dated Jul. 19, 2007.

* cited by examiner

PARALLELIZATION OF BAYESIAN NETWORK STRUCTURE LEARNING

CROSS REFERENCE TO RELATED APPLICATION

The present application is a U.S. National Phase Application under 35 U.S.C. §371 of International Application No. PCT/CN2004/001589 filed Dec. 31, 2004 entitled PARALLELIZATION OF BAYESIAN NETWORK STUCTURE LEARNING.

FIELD

Embodiments of the invention relate to network structure learning, and particularly to parallelization of Bayesian network structure learning.

BACKGROUND

Large amounts of information, especially related information, may be organized into network structures. A Bayesian network is a common example of such a network structure. The use of Bayesian networks is increasing in bioinformatics, pattern recognition, statistical computing, etc. The learning of a Bayesian network structure is very computationally intensive, and the solution for finding a true "optimal" structure may be NP-complete and may be impractical or impossible to determine. Even as the learning of Bayesian network structures is very computationally intensive, networks with much larger data sets are being explored, which may increase the computational intensity, and potentially include an exponential increase in computational intensity. Heuristic approaches often focus on improving the performance efficiency of structure learning, for example, decreasing execution time. Performance efficiency is increasingly important in providing acceptable practical solutions to modern networks.

Parallel learning approaches have been considered to include the resources of multiple computation machines and/or processing cores in performing a structure learning algorithm. The parallel nature of these approaches attempts to distribute work among multiple resources to reduce the time any one system spends to find a solution. Traditional parallel learning distributes computation tasks in a basic, naïve manner, which typically considers only numbers of tasks assigned to each parallel computing resource in distributing the computation tasks among the parallel computing resources and fails to consider task complexity.

For example, in a neighbor score computation, a master or control node may distribute a neighbor computation to each of two parallel computing resources, or nodes. A node may check a score cache to determine if a family score is known for the structure. If the score is known (resulting in a cache hit), the computing resource may simply load the score and use it to compute the neighbor score (the score of the directed acyclic graph (DAG), or structure, of interest). If the score is not known (resulting in a cache miss), the computing resource may be required to compute the family score prior to computing the neighbor score. If the first node has a cache hit, its computation time in determining the neighbor score will be much less than the time for the second node to compute the score of its neighbor. Thus, there may be a period where the computing resource with the cache hit and/or the master or control node sit idle (e.g., not performing useful work) while waiting for the second node with the cache miss to complete calculations prior to execution/distribution of more tasks. This results in sequentialization of the parallel execution.

Thus, current or traditional parallel approaches to structure learning may fail to provide a desired performance for structure learning for networks of increasing size and complexity, and may fail to provide the tools for proper load balance among the parallel nodes, and scalability of the system.

BRIEF DESCRIPTION OF THE DRAWINGS

The detailed description below includes various illustrations in figures and accompanying drawings by way of example, and not by way of limitation. These figures may be briefly described as follows.

DETAILED DESCRIPTION

Structure learning in a very general sense has application with Bayesian networks as a method for discovering the probabilistic relationship between variables in the network, and constructing a network structure representation based on the probabilistic relationships. Hill-climbing is a basic algorithm used for learning static and/or dynamic Bayesian networks, and may include the use of a score cache, which is a multi-dimensional sparse matrix, each element of the matrix storing the score of a node family or family of nodes (or simply "family" herein). A family includes a current, or target, node of interest (the child node) and the parent nodes (or simply "parents" herein) of the current node. Parent and target nodes may be related with a probabilistic relationship. The score cache may be used to store a score of a family after the score has been computed.

For structure learning, a learning algorithm generally first loads training data (known relationships) and computes the score for a start point, or an initial current structure. A start point may be an initial user-defined Bayesian Network structure from which the structure learning will begin. The neighbors (structures separated from the current structure by an edge difference) of the start point could be generated and each neighbor's score computed. A traditional approach to score computing for each neighbor involves looking up a score cache to determine whether a score for a family corresponding to the neighbor is known, or already computed. If the family score is available, the score may be loaded directly and the neighbor score computed. If the score is unavailable, the score of the entire structure (including the family) is computed. The family score may be computed and stored with a score cache update. The process generally repeats for all neighbors, and the algorithm chooses the neighbor with the maximum score as the new current structure from which a next iteration of learning may begin. Optimally the process is repeated until no neighbor exists that can score higher than the current structure. Practical applications often use heuristics, as determined based on specific criteria for an implementation.

Parallelization, as discussed previously, may be accomplished by distributing neighbor scoring tasks/calculations among nodes in a cluster system and/or among multiple parallel cores (e.g., parallel arithmetic logic units (ALUs), parallel processing cores). In a naïve parallelization approach, each node may receive one or more neighbors to compute, the neighbors being equally distributed among the nodes. However, the complexity of computing the score could be highly dependent on the contents of the score cache. If one node achieves a cache hit when querying the score cache for a family score in a neighbor computation, and another node achieves a cache miss when querying the score cache for its family score, the node achieving a cache hit may have a significantly lower computation burden. Multi-processor and/or hyper-threading systems may reduce the imbalances inherent in computational complexity diversity; however, such a naïve approach results in inferior speed-up when running on a cluster system. In a cluster system there is potentially a great amount of time wasted by inter-process waiting and/or synchronization of the nodes. This affects the scalability of the parallel approach because the effectiveness of the parallel approach in systems of increasing numbers of computing nodes will exacerbate the problems.

System efficiency can be improved by providing improved load-balancing among the parallel computing nodes, which may provide improved scalability. If the computational burden at each load were approximately equal, there should be less inter-process waiting among the nodes. The score cache may be pre-loaded with family scores prior to the distribution of neighbors to score. If the family scores were selectively loaded into the score cache, the cache miss rate among computing nodes could be significantly reduced, and may be eliminated. In one embodiment the families that will be used in a structure learning iteration or procedure may be determined, and the score cache loaded with the scores of those families. For example, a master node could determine what neighbors will be scored and determine what family or families could be used to compute the scores of those neighbors. A family score not available or present in the score cache may be noted and/or "placed" in a task queue. Placing a family in a task queue may refer to obtaining and placing a handle to a family, tagging the family with a header, or other mechanism to mark the family as being missing from the score cache. In one embodiment the master node distributes the family or families to be computed (e.g., the queued families) to the parallel computing nodes (e.g., distributing tasks from a task queue). When the scores of the families are known, they may be loaded into the score cache, and the score cache distributed to the parallel computing nodes.

In one embodiment pre-statistics are determined, which refers to determining what neighbors (add, delete, or reverse edge) will be scored, and which family scores will be needed to compute those scores. Cache score indices may be generated as part of the pre-statistics to designate a family for scoring. The cache score indices generated may be distributed to a corresponding cluster node and the family score computed at the node for loading the score cache. The computed scores may be transmitted back to a master node, which gathers the statistics and synchronizes the data among the cluster nodes. The synchronization of the data may be accomplished by loading the score cache and distributing the cache among the cluster nodes. Each cluster node may then have a score cache with a guaranteed hit for the neighbor(s) to be processed by the node. Neighbor computation tasks may be distributed to the cluster nodes for calculation, which may be efficiently processed as each node may achieve a cache hit for a family to be used in the neighbor calculation. This improves the useful work provided by each cluster node, and provides scalability from few nodes in the cluster to potentially hundreds or thousands of nodes with near linear speedup.

Intelligently loading the score cache provides better load balancing than simple computational task distribution, which does not account for task complexity differences. The load balancing may provide for distribution of the family score calculations and the neighbor scoring, with each task of approximately comparable complexity and computational burden. Consider a learning structure having N neighbors and M heterogeneous cluster nodes. In such an implementation, each node will compute either [N/M] or [N/M]+1 neighbors, depending on the distribution. If $N \gg M$, the computations may be considered to be approximately equivalent. Thus, a structure learning algorithm could know which scores are to be computed and stored, and execution time may be estimated for each node. Intelligently loading and distributing the score cache may also provide lower synchronization communication overhead as compared to traditional approaches. For example, there may be only several hundred bytes of data to be transferred within the cluster in a synchronization cycle, which could be considered an insignificant amount in a cluster having 100 MB or greater bandwidth. Experiments indicate that the pre-computation of the family scores in the score cache provides better load balancing as compared to traditional parallel approaches, and significantly minimizes the communication time. Experimental data shows approximately a 9.5× speedup on a 12-way cluster system, and can potentially achieve nearly linear speedup on clusters up to thousands of processors.

Figure 1:
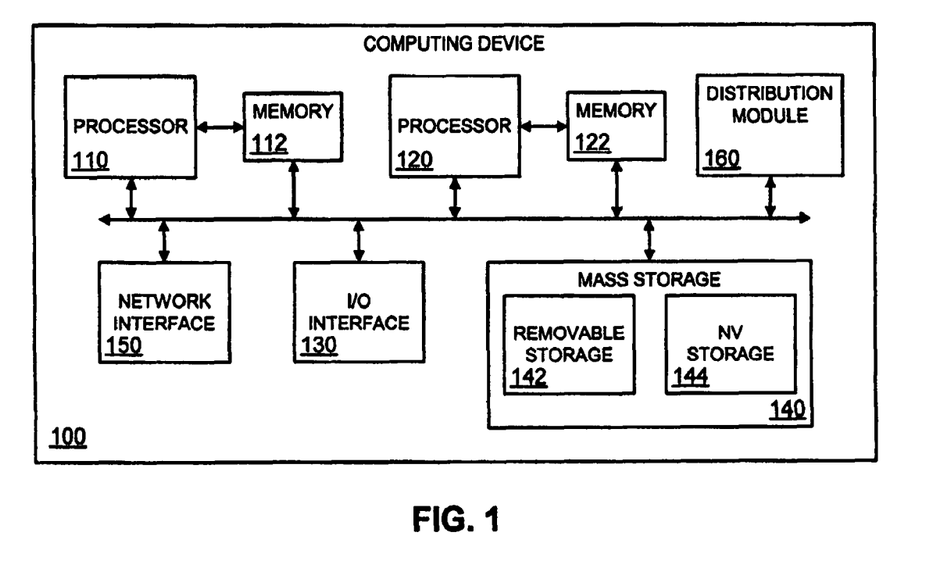
FIG. 1 is an embodiment of a block diagram of a computing node having a distribution module.

FIG. 1 is an embodiment of a block diagram of a computing node having a distribution module. Computing node 100 represents a computer, server, workstation, or other computing device/apparatus/machine. Computing node 100 may be multi-threading to allow simultaneous/parallel handling of different processes. Processor 110 represents one or more processing units and/or computing cores. Processor 110 may include a central processing unit, a microcontroller, a digital signal processor (DSP), an ALU, etc. Processor 120 likewise represents one or more processing units and/or computing cores, and may include a central processing unit, a microcontroller, a DSP, an ALU, etc. Processors 110 and 120 may operate in parallel. In one embodiment processors 110 and 120 represent parallel processing cores of computing node 100. In one embodiment computing node 100 does not include processor 120. Computing node 100 may represent a simultaneous multi-processor (SMP) system or an on-chip multi-processor (CMP) system.

Memory 112 may provide storage for temporary variables and/or instructions for execution by processor 110. Memory 112 may represent on-chip memory, for example, a cache layer on processor 110, volatile storage on a system bus of computing node 100, a system random access memory (RAM), etc. Memory 112 may be accessible directly by processor 110, accessible over a system bus, and/or a combination of these. Memory 122 may be similarly described with respect to processor 120.

In one embodiment computing node 100 includes I/O (input/output) interface 130, which represents one or more mechanisms/devices through which computing node 100 may receive input from an external source and/or provide output to an external source. An external source may include another computing system, a user, etc., and may include display devices, cursor controls, alphanumeric input devices, audio input and/or output devices, visual display (e.g., light emitting diodes (LEDs)), etc. I/O interface 130 may also include drivers for I/O devices. Information/data/instructions received through I/O interface 130 may be stored in memory 112 and/or memory 122 and/or mass storage 140. Mass storage 140 represents one or more of various storage mechanisms, including removable storage 142 (e.g., disk drives, memory sticks/cards/slots, universal serial bus (USB)-connected devices, etc.) and non-volatile storage 144 (e.g., disk drives, memory sticks/cards, slots, hard disk drives, etc.). Mass storage may store programs/application and/or instructions for loading into memories 112 and/or 122 for execution on processors 110 and/or 120, and/or data relating to or associated with a program or instruction.

In one embodiment computing node 100 may include network interface 150, which may include a wired or wireless interface and/or both wired and wireless interfaces. Network interface 150 may represent a network card/circuit through which computing node 100 may interface with a parallel computing device over a network, for example, a cluster node.

In one embodiment computing node 100 includes distribution module 160, which may represent one or more components to provide functions for structure learning of a data network. Distribution module 160 may include a software and/or hardware component. Distribution module 160 may represent a program executed by processor 110 or processor 120, or be part of a component on computing node 100. For example, an embedded system may provide distribution functions to computing node 100. Distribution module 160 in general represents the ability of computing node 100 as a master computing node to determine how to distribute structure learning functions and distribute those functions/tasks/computations to parallel computing nodes/devices/machines. Distribution module 160 may also represent the ability of computing node 100 as a slave computing node to receive tasks to be performed, and or to exchange information relating to synchronization of parallel computing nodes.

Distribution module 160 is shown generically in computing node 100, and may be understood as including software, hardware and/or a combination, as data stored on mass storage 140, as executing in one or both of processors 110 or 120, as residing in one or both of memory 112 or 122, as data to execute distribution module 160 received over network interface 150, and/or as controlled via I/O interface 130 or an external system interfaced through I/O interface 130.

Figure 2:
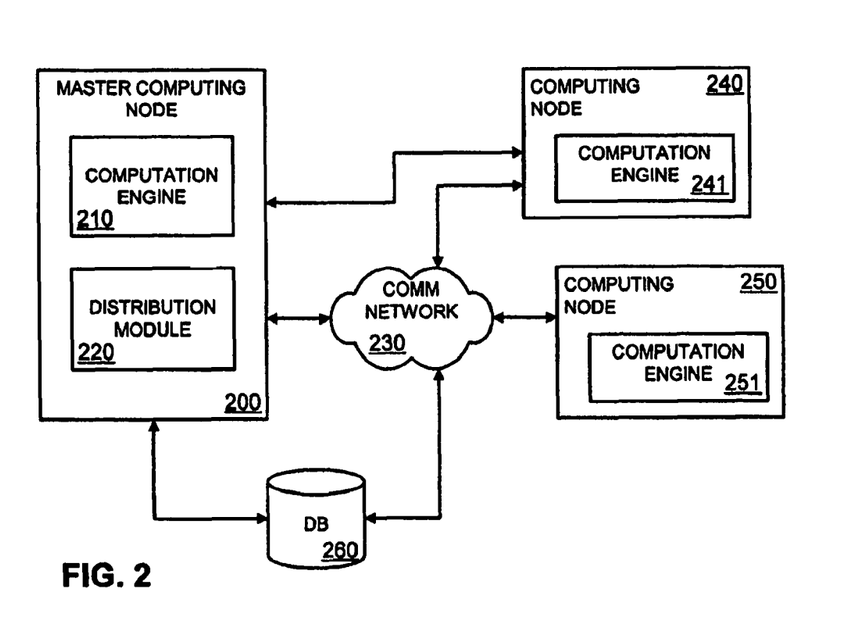
FIG. 2 is an embodiment of a block diagram of a computing node having a distribution module interconnected with other computing nodes.

FIG. 2 is an embodiment of a block diagram of a computing node having a distribution module interconnected with other computing nodes. Master computing node 200 represents a device, system, apparatus, and/or computer that controls the execution of a computation task. In one embodiment master computing node 200 selectively distributes computations to be performed in parallel by multiple computing nodes, which may include computing nodes 240 and/or 250 and/or master computing node 200. For example, master computing node 200 may distribute computations relating to neighbor score computing in implementation of a network structure learning algorithm to computing nodes 240 and 250, which may represent computers, workstations, processors, entities, computing resources, etc. Master computing node 200 may include computation engine 210, which may include a processor, a computation core, an arithmetic unit, etc. Computation engine 210 enables master computing node 200 to perform computations/calculations related to structure learning, including and not limited to: family score computations, neighbor score computations, matrix calculations, execution of algorithms, etc.

In one embodiment master computing node 200 includes distribution module 220, which may include hardware and/or software to provide distribution functions and/or direct/manage/control distribution operations. Distribution module 220 may distribute information and/or computation requests to computing nodes 240 and/or 250 over communication (comm) network 230. For example, information may include data gathered and/or results generated by computation engine 210 and/or computation engines 241 and 251. Results may include family scores, and the information may include the family scores, for example, in a score cache. Distribution module 220 may include and/or execute algorithms to determine a manner in which to distribute the information to computing nodes 240 and 250. In one embodiment distribution may be described as distributing [M/N] or [M/N]+1 scores for a computing node to compute, where M represents the number of family scores to compute, and N represents the number of cluster nodes (computing nodes). If M is not evenly divisible by N, there will be an uneven distribution to the computing nodes, and one or more nodes will receive an extra score to compute (and so a node may be distributed [M/N]+1).

In one embodiment communication network 230 represents a wide area network (WAN), e.g., the Internet, and may also represent a local area network (LAN), or other local interconnection between computers. Communication network 230 may represent a combination of a LAN and a WAN. Communication network 230, representing an interconnecting of computing devices, should not be confused herein with a data network or network structure (e.g., a Bayesian network), which may refer to a logical representation of information and internal relationships of the information.

In one embodiment database (DB) 260 is coupled with master computing node 200, which may be a direct link, or a communicative interface over, for example, communication network 230. In this example communication network 230 may represent one or more intermediate connections between master computing node 200 and database 260. Computing nodes 240 and 250 may also be interconnected with database 260. Database 260 may represent any number of database hardware devices, servers, etc., that may store information/data. In one embodiment database 260 includes information related to a network structure to be learned. For example, database 260 may include the evidences (e.g., known data, training data) from which one or more families or other network structures are derived. Thus, database 260 may include the data with which to learn a structure, the data from which the neighbors are determined, the families associated with neighbors are determined, etc. Database 260 may also be considered to store the network structures themselves. Handles may be generated for the network structures either by database 260 and/or master computing node 200.

Figure 3:
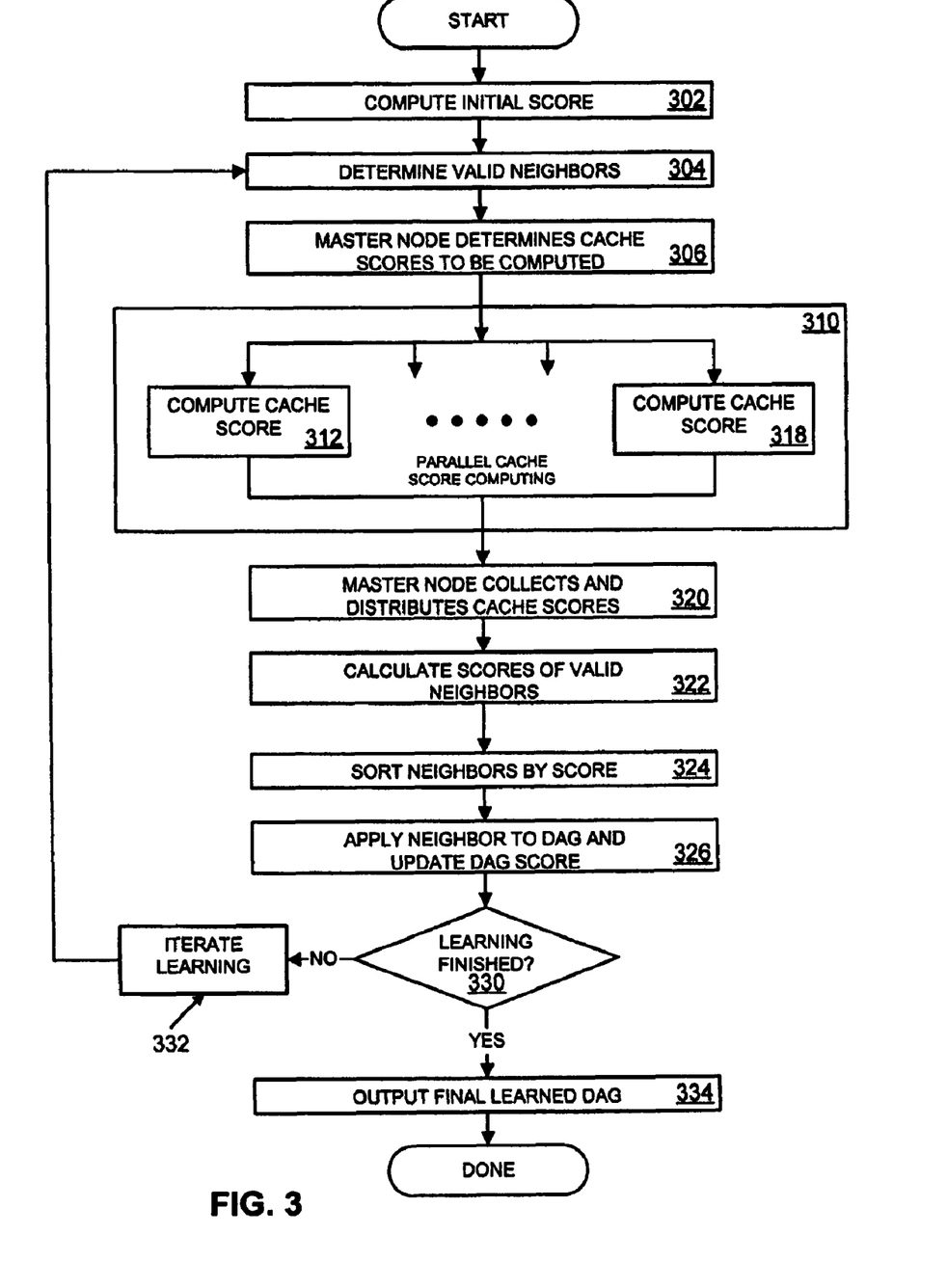
FIG. 3 is an embodiment of a flow diagram of structure learning with parallel score cache loading.

FIG. 3 is an embodiment of a flow diagram of structure learning with parallel score cache loading. Structure learning is started, and an initial score is computed, 302. A master computing device, or node, may be a device that is executing a structure learning algorithm, and distributing computations to be performed by parallel computing devices. The master computing device, as part of executing the algorithm, may select a starting structure from which to begin the learning. The score of the initial structure may be performed by the master computing device, in one embodiment, prior to distributing computation tasks to parallel computing devices, or nodes. The master computing device may perform pre-statistics, which refers herein to one or more determinations and/or operations to provide load balancing for efficient use of computational resources. Thus, the master computing device may determine valid neighbors of the starting structure, 304. The families associated with the neighbors may be determined. The family scores may be computed and loaded into a score cache. On a first iteration, the cache may not contain any valid data, and all families determined to be associated with the determined valid neighbors may be computed. Otherwise, for each valid neighbor, the master computing device may search the score cache to determine whether the score for the family is available in the score cache. This determination may be part of determining the cache scores to be computed, 306. If a family score is not found in the cache, the family may be recorded in a task queue and other families searched until all neighbors are processed. Thus, all valid neighbors (or families) may simply be looped.

The tasks in the task queue may be distributed to the working nodes (the computing or cluster nodes), which may or may not include the master node. The family scores may then be computed in parallel, or simultaneously or substantially simultaneously, 310-318. The results of the cache score computing may be reported back to the master computing node, which may collect the results and update the score cache, and then distribute the updated score cache to the other computing nodes, 320. The nodes may then compute the scores of the valid neighbors, 322. In so doing, it may be possible that no cache misses occur in family lookup by the computing nodes, because of computing the family scores in the intelligent manner described. As with other structure learning algorithms, the scores may then be sorted by score, 324, and the neighbors applied to the DAG and the DAG score updated, 326. If the learning is finished (meaning the last iteration has been reached), 330, the final updated DAG is output and the learning ends, 334. The last iteration may be an explicit end to learning (e.g., no neighbor achieves a higher score than the current structure), or a heuristic limit or threshold (e.g., number of neighbors searched, time limit) has been reached. If the learning is not finished, the learning may be iterated by the master computing node, 332, and the process continued until the end of learning.

Figure 4:
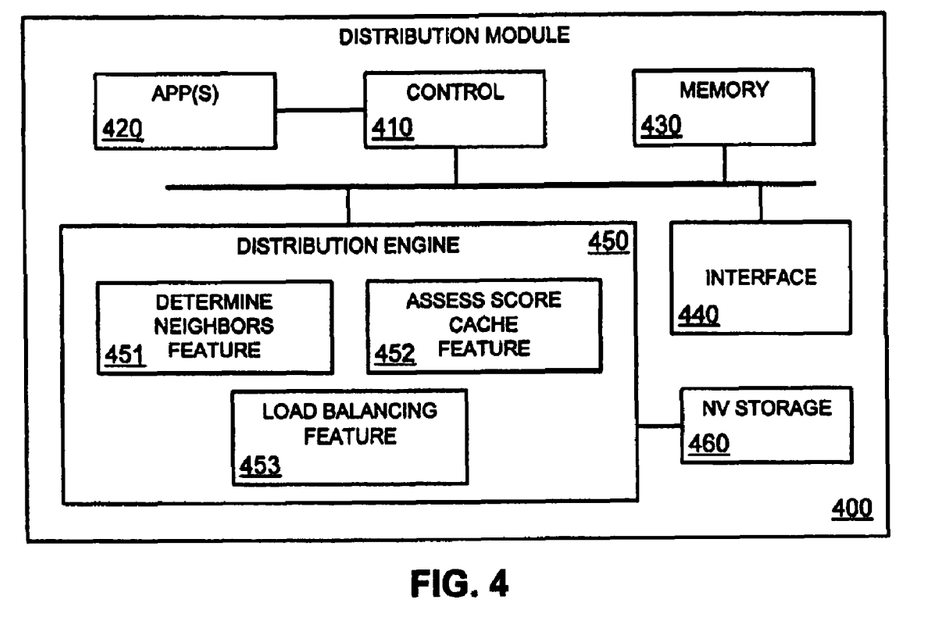
FIG. 4 is an embodiment of a block diagram of a distribution module.

FIG. 4 is an embodiment of a block diagram of a distribution module. Distribution module 400 represents a circuit, a combination of logic, firmware or group/series of instructions for execution on a computation/logic device, a subsystem, or a virtual subsystem that is configured, enabled, or otherwise able to perform operations related to distribution of computations in a structure learning sequence. Control logic 410 directs the flow of operation of module 400. In one embodiment, control logic 410 is a series of software/firmware instructions to perform logic operations. In another embodiment, control logic 410 can be implemented by hardware control logic, or a combination of hardware-based control logic and software instructions.

Interface 440 provides a communications interface between module 400 and an external electronic system (not shown) and/or network. For example, module 400 as part of a host computing system may have interface 440 to provide a communication interface between module 400 and the host computing system via a system bus. In one embodiment interface 440 includes a communication path to a network. For example, interface 440 may include an interface to an Ethernet, Internet, wireless communication channel, etc.

Module 400 may include one or more applications 420. Application 420 represents one or more programs and/or other series of instruction sequences that are executed on control logic 410. In one embodiment module 400 may execute part of all of a user application or a system application. Application 420 may provide instructions to control logic 410 to cause module 400 to perform operations. Instructions may also be provided to control logic 410 by memory 430. For example, control logic 410 may access, or read a portion of memory 430 to obtain instructions to perform a series of operations and/or data for use with operations. Thus, control logic 410 can receive one or more instructions from internal application software running locally on module 400, such as application 420, from memory 430, and/or from external applications, storage media, etc., through interface 440.

Module 400 includes distribution engine 450, which may enable module 400 to perform operations including determining what neighbors will be computed, what families are associated with the neighbors to be computed, determining what value(s) may or may not be in a score cache, update and distribute the cache, or balance distribution of computations among several nodes. Distribution engine 450 is shown with various features, which represent functions or features that distribution engine 450 may provide. Each function or feature is provided through performing one or more operations. Distribution engine 450 may include one or more of: determining neighbors feature 451, assess score cache feature 452, and load balancing feature 453. In one embodiment one or more of these features may exist independently of and/or be external to module 400. Thus, distribution engine 450 may be more complex or less complex, containing some, all, or additional features to those represented in FIG. 4.

Determine neighbors feature 451 enables module 400 to determine a family structure for scoring in structure learning. An algorithm of module 400 may begin with a current structure and determine what are the structure's neighbors. The neighbors may be add, delete, or reverse edge neighbors. Determine neighbors feature 451 may include determining one or more families that could be used in calculating the neighbors. For example, the current structure may have a family (a structure of a child node and parents) that may be used to determine one or more neighbor scores.

Assess cache feature 452 enables module 400 to determine whether a particular family score is in a score cache and/or load the score into the score cache. In one embodiment module 400 searches a global score cache to determine if all families needed to compute all neighbors determined are present in the score cache. Families not in the score cache may be computed and placed in the score cache. The updating of the score cache may be accomplished by module 400 distributing the un-cached families to the parallel computing nodes to be scored, and loading the score cache with the computed results upon completion by the parallel computing nodes.

Load balancing feature 453 enables module 400 to balance the distribution of computation tasks to other nodes in the cluster. In one embodiment load balancing includes module 400 determining how many families are to be computed, and distributing an even number of computation tasks to each node. In the case where the number of families to calculate is not evenly divisible by the number of cluster nodes, one or more cluster nodes may be distributed one more computation task than other nodes. When the number of families to be scored is very high compared to the number of nodes, the difference of one computational task is relatively insignificant. Even load balancing based at least in part on computational intensity of the computation tasks reduces the delays and inefficiencies related to a node finishing computations significantly sooner than another node. By determining prior to distribution of tasks which families need to be scored, and then distributing the families for scoring, the balance of tasks may be more even than traditional approaches to parallel task distribution.

In one embodiment module 400 is implemented with firmware, software, or a combination of firmware and software. Module 400 may be implemented in hardware and/or a combination of hardware and software and/or firmware. The software and/or firmware content may provide instructions to cause executing hardware to perform various operations, including some or all of the functions/features described above. Instructions that may cause/result in the performing of functions/operations described herein may be received via an article of manufacture by a machine/electronic device/hardware and performed by/on the machine. An article of manufacture may include a machine accessible/readable medium having content to provide the instructions. A machine accessible medium includes any mechanism that provides (i.e., stores and/or transmits) information/content in a form accessible by a machine (e.g., computing device, electronic device, electronic system/subsystem, etc.). For example, a machine accessible medium includes recordable/non-recordable media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.), etc. The machine accessible medium may further include a computing system having code loaded on the computing system that the computing system may be able to execute when the computing system is in operation. Thus, delivering a computing system with such code may be understood as providing the article of manufacture with such content described above. Furthermore, storing code on a database or other memory location and offering the code for download over a communication medium via a propagated signal may be understood as providing the article of manufacture with such content described above.

Figure 5:
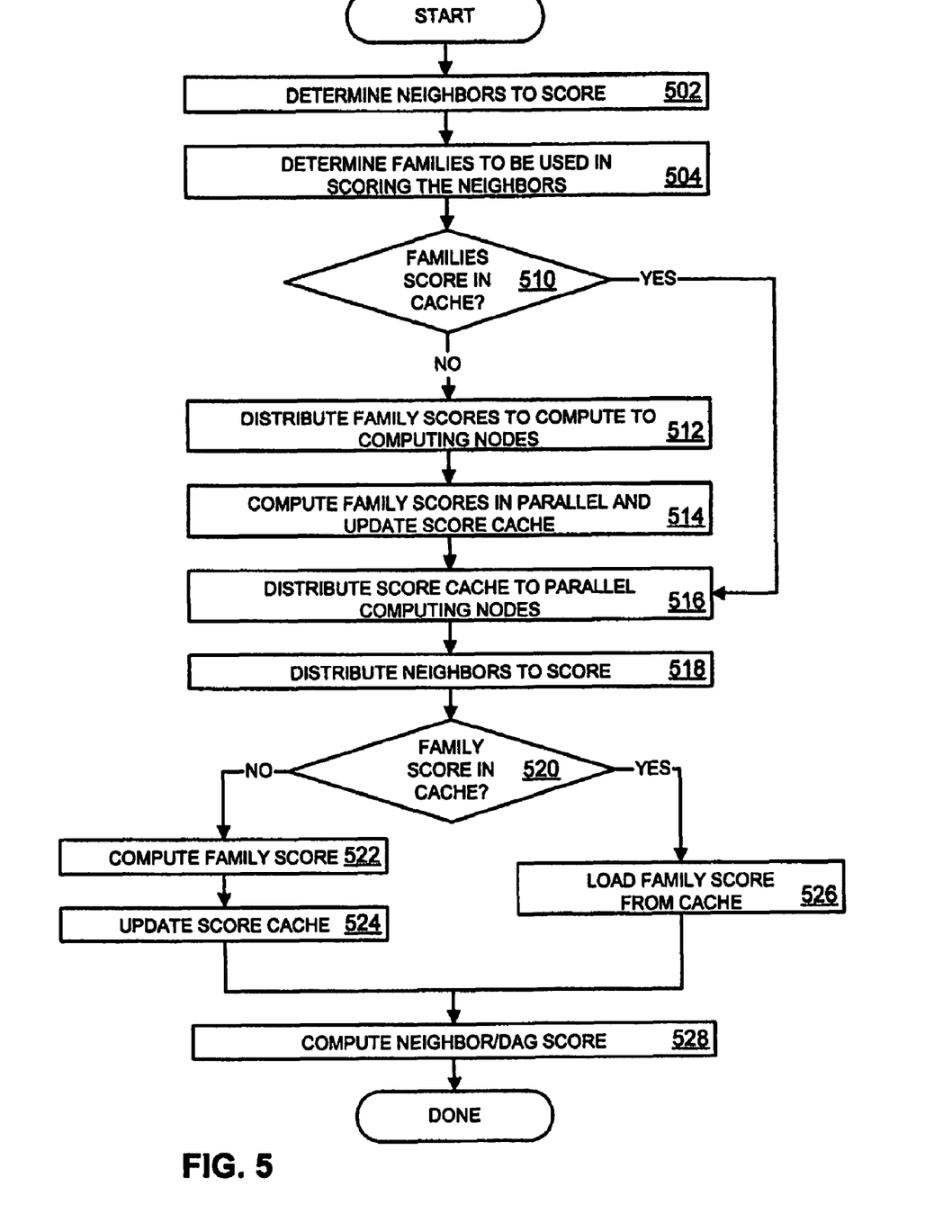
FIG. 5 is an embodiment of a flow diagram of structure learning with cache pre-computations.

FIG. 5 is an embodiment of a flow diagram of structure learning with cache pre-computations. A master node may execute a structure learning algorithm/program/function and be internetworked with a cluster of nodes that will perform parallel computing operations to result in a distributed computing burden, which may improve performance of the structure learning process. The master node in determining tasks to distribute to the parallel cluster may determine neighbors to score, 502. The neighbors are the neighbors of a current DAG that may be explored to determine an improved structure (e.g., a structure with a better score). The computation of the neighbors may involve the use of multiple families, which may be determined by the master node to be used in scoring the neighbors, 504.

The master node may obtain and/or cross-check a score cache, or temporary storage of family scores, and determine if a score for a family is in the score cache, 510. If there are multiple families, each family may be searched in the score cache to determine what scores may need to be added in order to have all family scores in the score cache. If all families of interest are in the score cache, the cache may be distributed, 516. If all families of interest are not in the score cache, the master node may direct operations to load the score cache with the scores. A family of interest may be understood as one that may be used in the neighbor computing.

Thus, the master node may distribute family scores of the families missing from the score cache to the computing nodes to be computed, 512. Note that if the calculation tasks are distributed approximately equally among the computing nodes, there will be a good load balance of computations, as all nodes will have an approximately equal number of operations of approximately equal computational intensity to perform. The family scores may then be performed in parallel in the cluster and the scores returned to the master node, which updates the score cache with the scores, 514. In one embodiment an updated score cache or a score cache with the families of interest is distributed from the master node to the parallel nodes, 516, for use in neighbor computations. The neighbors may also be distributed for scoring, 518, from the master node to the parallel nodes.

In one embodiment when a computing node has a neighbor to score, the computing node will first check the score cache to determine if the family score is in the cache, 520. In this way, the computing node reduces the chances of duplicating work. In a traditional implementation of parallel score computing, if a parallel computing node checked the score cache, the family score of interest may or may not be present in the score cache. If the score were not present, the computing node would have to compute the family score, 522, and the score cache would be updated, 524. However, in the implementation described, the neighbors to score and associated families are determined prior to neighbor scoring by the parallel nodes, and the score cache may be loaded and distributed with the family scores. Thus, the negative branch, 522, may potentially never be taken because the score cache is loaded with all relevant family scores. This could save many cycles of useful work by potentially multiple of the computing nodes, and the more even distribution of work could significantly improve the structure learning process. With the score cache pre-loaded with relevant values, the parallel node may load the family score directly from the cache without having to compute it, 526. The neighbor score is determined and/or the score of the DAG determined and updated, 528.

Various references herein to an "embodiment" are to be understood as describing a particular feature, structure, or characteristic included in at least one embodiment of the invention. Thus, the appearance of phrases such as "in one embodiment," or "in alternate an embodiment" may describe various embodiments of the invention, and may not necessarily all refer to the same embodiment. Besides what is described herein, various modifications may be made to embodiments of the invention without departing from their scope. Therefore, the illustrations and examples herein should be construed in an illustrative, and not a restrictive sense. The scope of the invention should be measured solely by reference to the claims that follow.

What is claimed is:

1. A method for network structure learning comprising:
    determining whether a score cache includes a score for each of a plurality of network node families, the family scores to provide values with which to compute scores for multiple neighbors;
    placing, in a queue, node families for which the score cache does not include scores;
    distributing an integer value comprising the integer quotient of [M/N] of node families out of the queue to each parallel computing device to score, wherein M is an integer representing the number of node families to score and N is an integer representing the number of parallel computing devices;
    loading resulting scores from the parallel computing devices for the scored node families into a master score node; and
    synchronizing the parallel computing devices with the master score node to make the resulting scores available to the parallel computing devices for scoring the neighbors.

2. A method according to claim 1, wherein the plurality of network node families comprise family structures of a Bayesian network.

3. A method according to claim 1, wherein synchronizing the parallel computing devices comprises distributing the score cache loaded with the family scores.

4. A method according to claim 3, wherein scoring the neighbors comprises:
    searching the score cache for a score for a node family associated with a neighbor;

if the searching results in a cache hit, loading the node family score; and if the searching results in a cache miss, computing the node family score;

wherein the searching results in no cache misses.

5. A method according to claim 1, further comprising distributing to the parallel computing device the neighbors to be scored.

6. An apparatus comprising:
a memory having data to define operations including
searching a score cache for a Bayesian network family structure associated with neighbor scoring of a network structure learning algorithm,
queuing for computation among parallel computing nodes the family structures missing from the score cache,
distributing to the parallel computing nodes for scoring the missing family structures an integer value comprising the integer quotient of [M/N] computing tasks to calculate the scores of the missing family structures, wherein M is an integer representing the number of node families to score and N is an integer representing the number of parallel computing nodes,
distributing resulting calculated scores and the score cache among the parallel computing nodes to provide the scores of the score cache and the resulting calculated scores to the parallel computing nodes for computation of scores of neighbors associated with the Bayesian network family structures, and
distributing to the parallel computing nodes tasks to calculate scores for the neighbors; and
a processor coupled to the memory to execute instructions on the data in the memory to produce the operations.

7. An apparatus according to claim 6, wherein the memory having data defining queuing the family structures missing from the score cache comprises the memory having data defining generating indices for each missing family structure.

8. An apparatus according to claim 6, wherein the memory having data defining distributing the resulting calculated scores and the score cache further comprises the memory having data defining receiving the calculated scores from the parallel computing nodes, updating the score cache with the calculated scores, and sending the updated score cache to each parallel computing node.

9. An apparatus according to claim 6, the memory further having data defining the processor as one of the parallel computing nodes, and wherein distributing to the parallel computing nodes comprises the processor receiving tasks to compute.

10. A system comprising:
a memory having data to define operations including
searching a score cache for a Bayesian network family structure associated with neighbor scoring of a network structure learning algorithm,
queuing for computation among parallel computing nodes the family structures missing from the score cache,
distributing to the parallel computing nodes for scoring the missing family structures an integer value comprising the integer quotient of [M/N] computing tasks to calculate the scores of the missing family structures, wherein M is an integer representing the number of node families to score and N is an integer representing the number of parallel computing nodes,
distributing resulting calculated scores and the modified the score cache among the parallel computing nodes to provide the scores of the score cache and the resulting calculated scores to the parallel computing nodes for computation of scores of neighbors associated with the Bayesian network family structures, and
distributing to the parallel computing nodes tasks to calculate scores for the neighbors;
a processor coupled to the memory to perform the operations defined in the data in the memory; and
a database coupled to the processor and to the memory to store the evidences from which the Bayesian network family structures are constructed.

11. A system according to claim 10, wherein the network structure learning algorithm comprises a hill-climbing algorithm.

12. A system according to claim 10, wherein queuing includes passing a handle to a family structure stored in the database.

* * * * *